United States Patent

Mizuhara et al.

(10) Patent No.: US 7,322,256 B2
(45) Date of Patent: Jan. 29, 2008

(54) BALL SCREW MECHANISM FOR ELECTRIC POWER STEERING APPARATUS

(75) Inventors: Masato Mizuhara, Osaka (JP); Satoshi Hatakeyama, Nara (JP); Tetsuya Murakami, Nara (JP); Yasuhiro Nakamura, Mie (JP)

(73) Assignee: Koyo Seiko Co. Ltd., Osaka (JP)

( * ) Notice: Subject to any disclaimer, the term of this patent is extended or adjusted under 35 U.S.C. 154(b) by 691 days.

(21) Appl. No.: 10/806,805

(22) Filed: Mar. 23, 2004

(65) Prior Publication Data

US 2004/0188171 A1 Sep. 30, 2004

(30) Foreign Application Priority Data

Mar. 25, 2003 (JP) .............................. 2003-083611

(51) Int. Cl.
*F16H 35/00* (2006.01)

(52) U.S. Cl. .................................. 74/388 PS; 74/424.83

(58) Field of Classification Search ............ 74/388 PS, 74/424.83; 180/444, 443
See application file for complete search history.

(56) References Cited

U.S. PATENT DOCUMENTS 2,780,943 A * 2/1957 Stump ..................... 74/424.87
3,661,030 A * 5/1972 Gagne ..................... 74/424.83
5,586,469 A 12/1996 Mitani et al.
6,454,042 B1 * 9/2002 Yoshida et al. ............. 180/444
2002/0003059 A1 1/2002 Yoshioka et al.
2002/0063014 A1 5/2002 Yoshida et al.

FOREIGN PATENT DOCUMENTS

| EP | 0673827 | 9/1995 |
| EP | 1 293 706 A2 | 3/2003 |
| JP | 2002-087288 A1 | 3/2002 |

* cited by examiner

*Primary Examiner*—David M. Fenstermacher
(74) *Attorney, Agent, or Firm*—Darby & Darby P.C.

(57) ABSTRACT

A first ball circulating hole and a second ball circulating hole for connecting a circulator are bored midway at a screw groove formed on an inner circumference of a ball nut, an intermediate groove path between the first and second ball circulating holes becomes the range of a ball screw track for circulating balls, and other ranges become a first outer track and a second outer track which are not the ball screw track. By making the groove depth of the intermediate groove path deeper than the groove depth of a first groove path of the first outer track and the groove depth of a second groove path of the second outer track, steps are formed between the ball screw track and the two outer tracks. These steps prevent an outflow of the balls from the intermediate groove path to the respective groove paths of the outer tracks.

4 Claims, 4 Drawing Sheets

BALL SCREW MECHANISM FOR ELECTRIC POWER STEERING APPARATUS

BACKGROUND OF THE INVENTION

1. Field of the Invention

The present invention relates to a ball screw mechanism for a type of electric power steering apparatus which assists the movement of a rack shaft by an electric motor, more particularly relates to a ball screw mechanism used for transmitting a driving force of the electric motor to the rack shaft as a steering shaft in the electric power steering apparatus.

2. Description of Related Art

Conventionally, in a so-called rack-assist-type electric power steering apparatus, the movement of the rack shaft in the axial direction is assisted by a driving force of an electric motor. In this type of electric power steering apparatus, a ball screw mechanism is constructed by forming a ball screw portion on the rack shaft and fitting a ball nut on an outside of the ball screw portion, so that the torque generated by the electric motor is transmitted to the rack shaft through the ball screw mechanism.

A screw groove is formed on the inner circumference of the ball nut, and a groove path formed by a combination of the screw groove and the ball screw portion of the rack shaft is filled with a plurality of balls. In such a construction, smooth rotation of the ball nut is ensured, and the rack shaft is moved in the axial direction as the balls move in the groove path with the rotation of the ball nut. Accordingly, since the ball nut can be rotated by the electric motor by attaching a large gear such as a bevel gear to the outer circumference of the ball nut and engaging a small gear attached to the motor shaft of the electric motor with the large gear, it is possible to assist steering by moving the rack shaft in the axial direction with the rotation of the ball nut.

Moreover, in the ball nut, in order to circulate the filled balls in a portion called a ball screw track within the groove path, a circulator is attached to the outside of the ball nut. The circulator is a tube-like member for returning the balls discharged outside the ball nut from one end portion of the ball screw track to the other end portion of the same inside the ball nut by transferring the balls via the outside of the ball nut. In other words, the groove path between two ball circulating holes for connecting both end portions of the circulator to the groove portion inside the ball nut becomes the ball screw track.

Note that, as a steering apparatus of a type different from the above-mentioned rack-assist-type electric power steering apparatus, for example, Japanese Patent Application Laid-Open No. 2002-87288 discloses an apparatus using a ball screw mechanism for transmitting a driving force between a steering wheel shaft to which a steering wheel is attached and a cross shaft connected to a steering mechanism. In this conventional steering apparatus, the groove path except the ball screw track in which the balls are actually circulated of the ball nut of the ball screw mechanism incorporated in the apparatus is not polished, and thereby preventing an outflow of balls from the ball screw track.

By the way, as described above, the ball screw mechanism needs to circulate the balls within the range of the ball screw track by the circulator. Therefore, when assembling the ball screw mechanism, there is the problem that the balls sometimes flow to the groove path outside the range of the ball screw track. Since the balls flowed to the groove path outside the ball screw track may interfere with the rotation of the ball nut, the flowed-out balls need to be discharged from the ball nut.

As a structure for discharging the balls flowed to the groove path outside the ball screw track from the ball screw mechanism, conventionally, in general, the ball nut is formed with a so-called open structure in its end portion. However, when the open structure is adopted, it is necessary to increase the outside diameter of the ball nut to ensure rigidity thereof, and consequently the whole ball screw mechanism becomes larger and there is the problem that the increase of the size of the ball screw mechanism does not meet the current situation where a reduction in the size of the apparatus is required. Moreover, in the ball screw mechanism incorporated in the electric power steering apparatus, since the ball nut is rotated at high speed by driving the electric motor, when the outside diameter of the ball nut is increased, the moment of inertia is considerably increased. Thus, there is a problem of deterioration of steering feeling in an electric power steering apparatus incorporating such a ball screw mechanism.

Further, when the open structure is not adopted for the ball nut, the balls flowed to the groove path outside the ball screw track will stay in the groove path outside the ball screw track. In this case, in some rotation state of the ball nut, there is a fear that the balls flowed to the groove path outside the ball screw track may push an end portion of the circulator and interfere with smooth circulation of the balls.

BRIEF SUMMARY OF THE INVENTION

The present invention has been made with the aim of solving the above problems, and it is an object of the present invention to provide a ball screw mechanism for electric power steering apparatus, capable of preventing an outflow of balls to a groove path outside a ball screw track by forming a step between a groove path of a screw groove corresponding to the ball screw track of a ball nut and groove paths on both sides thereof.

It is another object of the present invention to provide a ball screw mechanism for electric power steering apparatus in which the above-mentioned step is formed by making the depth of the groove path of the screw groove corresponding to the ball screw track of the ball nut deeper than that of groove in other portion, or by forming an opening edge on the ball screw track side of each through hole for ball circulation bored at both end portions of the ball screw track deeper than an opposite side opening edge.

It is still another object of the present invention to provide a ball screw mechanism for electric power steering apparatus capable of discharging balls flowed to a groove path outside a ball screw track by boring a ball discharge hole at the groove path outside the ball screw path and passing the balls through the ball discharge hole.

A ball screw mechanism for electric power steering apparatus according to the present invention, in which two ball circulating holes each connected to each end portion of a circulator for circulating balls via outside a ball nut are bored midway at a screw groove formed on an inner circumference of the ball nut fitted on an outside of a ball screw portion formed on a steering shaft, and the ball nut is rotated by driving an electric motor, and is characterized in that a step is formed between a portion of the screw groove, which becomes a ball screw track between the two ball circulating holes, and both or one of portions of the screw groove on the further outside than the respective two ball circulating holes.

In such a ball screw mechanism for electric power steering apparatus of the present invention, the step is formed between a portion of the groove path of the ball nut between both or one of two ball circulating holes to which each end portion of the circulator is connected, which becomes the ball screw track, and both or one of portions on both sides of the groove path between the ball circulating holes. Since the step limit an outflow of balls from the ball screw track, it is possible to prevent an outflow of balls from the ball screw track.

Further, the ball screw mechanism for electric power steering apparatus according to the present invention is characterized in that the step is formed by making a depth of the portion of the screw groove between the two ball circulating holes deeper than a depth of both or one of the portions of the screw groove on the further outside than the respective two ball circulating holes.

In such a ball screw mechanism for electric power steering apparatus of the present invention, the step formed by making a difference between the groove depth of a portion of the groove path corresponding to the ball screw track of the screw groove of the ball nut and the groove depth of other portion by, for example, performing polishing process only on the portion of the groove path corresponding to the ball screw track portion.

Further, the ball screw mechanism for electric power steering apparatus according to the present invention is characterized in that the step is formed at both or one of two ball circulating holes by forming an opening of ball circulating hole at the screw groove so that an opening edge on the side of the screw groove between two ball circulating holes is deeper than an opening edge on the further outside.

In such a ball screw mechanism for electric power steering apparatus of the present invention, the step is formed by forming an opening of ball circulating hole at the screw groove so that an opening edge on the ball screw track side of one or two ball circulating holes is deeper than an opening edge on the outer side by, for example, performing polishing process only on the portion of the groove path corresponding to the ball screw track portion.

Further, a ball screw mechanism for electric power steering apparatus according to the present invention, in which two ball circulating holes each connected to each end portion of a circulator for circulating balls via outside a ball nut are bored midway at a screw groove formed on an inner circumference of the ball nut fitted on an outside of a ball screw portion formed on a steering shaft, and the ball nut is rotated by driving an electric motor, and is characterized in that a ball circulating hole extending to outside of the ball nut and having a larger hole diameter than an outside diameter of the ball is bored at both or one of portions of the screw groove located on both sides of a portion of the screw groove between the two ball circulating holes.

In such a ball screw mechanism for electric power steering apparatus of the present invention, since a ball discharge hole having a larger diameter than the outside diameter of the ball and connecting the inside and outside of the ball nut is bored at a portion of the groove path outside the ball screw track, the balls flowed out of the ball screw track are discharged outside the ball nut through the ball discharge hole. Moreover, since it is only necessary to bore the above-mentioned ball discharge hole in the ball nut, an increase in the inertial moment of the ball nut due to a conventional open structure does not occur, and good steering feeling is maintained when the ball screw mechanism is incorporated in an electric power steering apparatus. Further, it is also possible to bore a plurality of ball discharge holes at the groove path outside the ball screw track at appropriate intervals.

The above and further objects and features of the invention will more fully be apparent from the following detailed description with accompanying drawings.

DETAILED DESCRIPTION OF THE INVENTION

The following description will explain the present invention, based on the drawings illustrating embodiments thereof.

Figure 1:
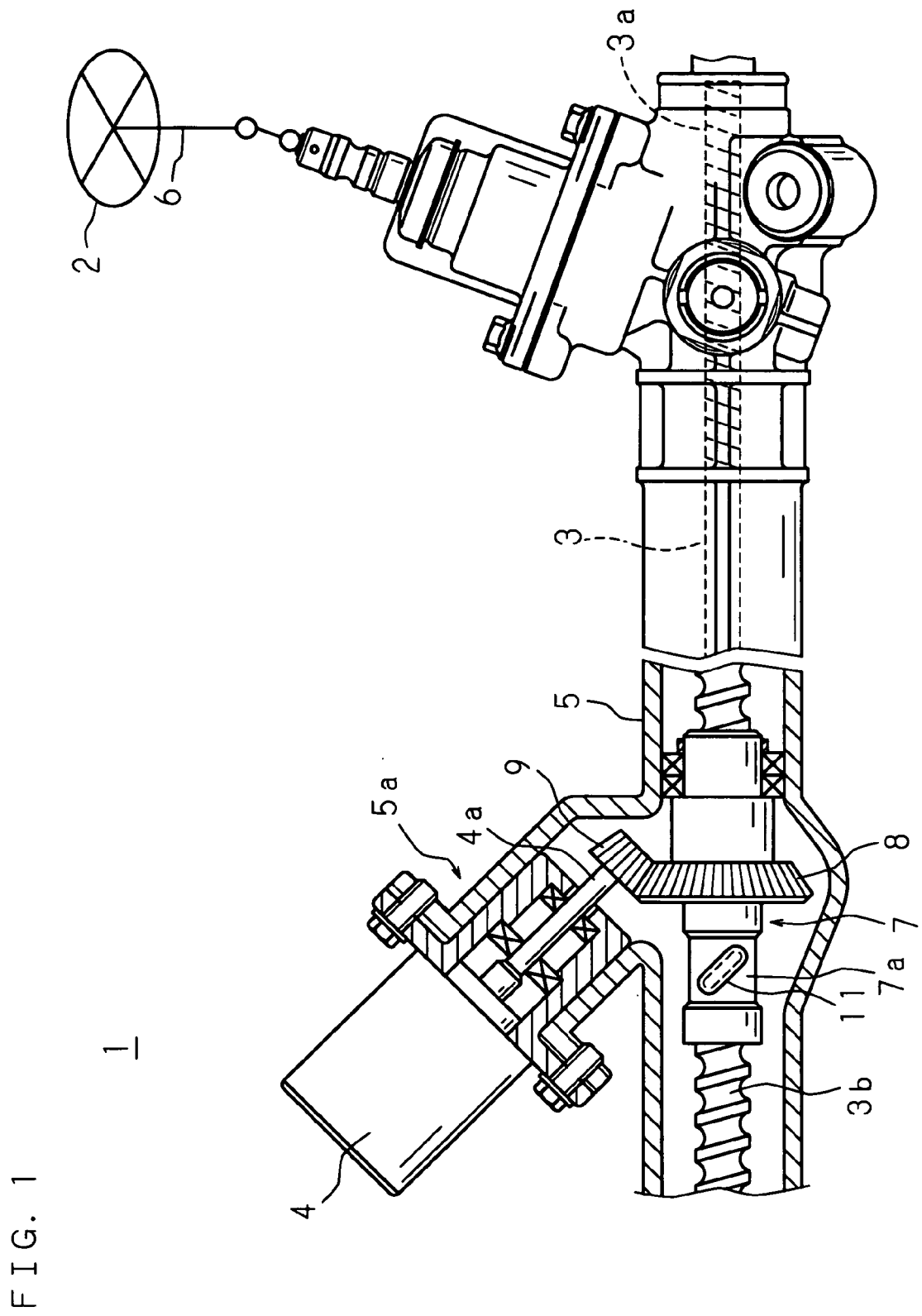
FIG. 1 is a partially broken schematic side view showing a schematic configuration of an entire electric power steering apparatus incorporating a ball screw mechanism for electric power steering apparatus according to Embodiment 1 of the present invention.

FIG. 1 is a partially broken schematic side view showing a schematic configuration of an entire electric power steering apparatus incorporating a ball screw mechanism for electric power steering apparatus according to Embodiment 1 of the present invention. An electric power steering apparatus 1 incorporating a ball screw mechanism of Embodiment 1 has a rack shaft 3 as a steering shaft and is supported inside a long tubular housing 5 so that it is movable in the left and right directions in FIG. 1. A rack unit 3a is formed on the right side portion of the rack shaft 3 in FIG. 1. The rack unit 3a is engaged with a pinion (not shown) provided on an end portion of a steering wheel shaft 6 to which a steering wheel 2 is attached. Therefore, the rack shaft 3 moves in the left and right directions in FIG. 1 with a rotation of the steering wheel shaft 6 in an interlocked manner. Note that, with the movement of the rack shaft 3 in the left and right directions, wheels are steered through a knuckle arm (not shown) connected to both end portions of the rack shaft 3.

Moreover, a ball screw portion 3b is formed on the left side portion of the rack shaft 3 in FIG. 1. By fitting a ball nut 7 on an outside of the ball screw portion 3b, a ball screw mechanism is configured. A large bevel gear 8 is attached to the outer circumference 7a of the ball nut 7, and a small bevel gear 9 attached to a motor shaft 4a of a steering assist electric motor 4 is engaged with the large bevel gear 8. Note that the electric motor 4 is mounted in a motor mount unit 5a formed to project from the housing 5.

The electric motor 4 is driven and controlled by a controller, not shown, according to a rotation of the steering wheel shaft 6 when the steering wheel shaft 6 is rotated by a driver. By rotating the ball nut 7 by transmission of the rotation of the motor shaft 4a of the electric motor 4 to the large bevel gear 8 from the small bevel gear 9, the movement of the rack shaft 3 is assisted.

Figure 2A:
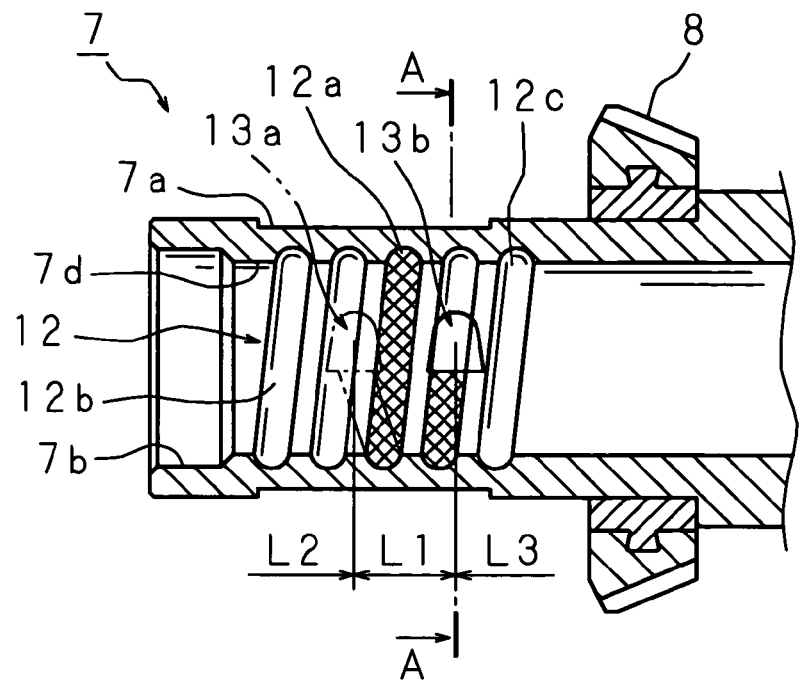
FIG. 2A is a cross sectional view of essential portion of a ball nut.

FIG. 2A is a schematic cross sectional view of essential portion of the ball nut 7. In the ball nut 7, a screw groove 12 is formed on a screwing portion 7d which is a range where an inner circumference 7b is formed with a smaller diameter. A first ball circulating hole 13a and a second ball circulating hole 13b penetrating to the outer circumference 7a side are bored at two positions, respectively, separated by a required distance in the middle of the screw groove 12. As shown in FIG. 1, both end portions of a circulator 11 for ball circulation attached to the outer circumference 7a of the ball nut 7 are connected to the first ball circulating hole 13a and the second ball circulating hole 13b, respectively.

By attaching the circulator 11 in this manner, a ball 20 (see FIG. 2B) is circulated through a portion (hereinafter referred to as an intermediate groove path 12a) of the screw groove 12 between the first ball circulating hole 13a and the second ball circulating hole 13b shown by cross-hatching in FIG. 2A and the circulator 11. Accordingly, the intermediate groove path 12a is a ball screw track L1 through which the balls 20 are circulated. Besides, both of a first groove path 12b, which is a portion in the screw groove 12 located further outside than the first ball circulating groove 13a with respect to the intermediate groove path 12a, and a second groove path 12c, which is a portion located further outside than the second ball circulating hole 13b with respect to the intermediate groove path 12a, are portions where the balls 20 cannot be circulated. Note that the first groove path 12b and second groove path 12c in which the balls 20 cannot be circulated will be hereinafter referred to as the first outer track L2 and the second outer track L3, respectively.

The screw groove 12 is formed by cutting process so that it is entirely uniform, but after cutting process, polishing process is further performed on the portion of the intermediate groove path 12a. Consequently, the surface roughness of the inner circumferential surface of the intermediate groove path 12a is improved compared to that of the first groove path 12b and second groove path 12c. Therefore, the balls 20 can more smoothly circulate in the ball screw track L1 than in other portions, namely, the first outer track L2 and second outer track L3.

By performing polishing process as mentioned above, as shown in FIG. 2B, the groove depth D1 of the intermediate groove path 12a becomes deeper than the groove depth D2 of the second groove path 12c of the second outer track L3 by the amount polished by polishing process. Specifically, since the second groove path 12c is not polished, a polish margin 7c (shown by cross-hatching in FIG. 2B), which was removed by polishing process in the intermediate groove path 12a, remains. Therefore, the groove depth of the intermediate groove path 12a and that of the second groove path 12c differ from each other by an amount equal to the thickness of the polish margin 7c, so that a step 14 is formed.

Figure 2B:
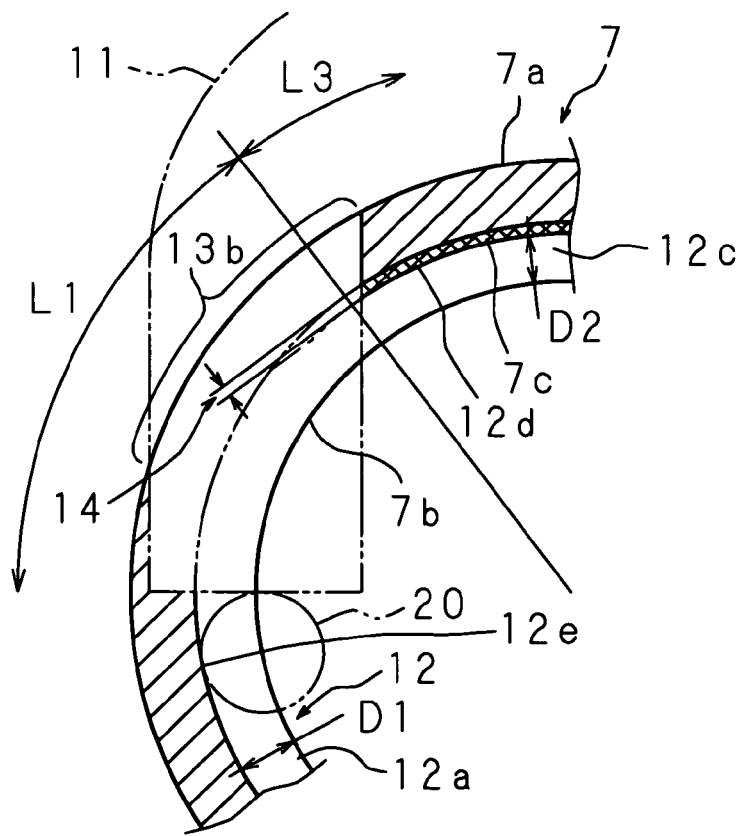
FIG. 2B is a schematic cross sectional view showing a part of the cross section cut along the A-A line of FIG. 2A.

Accordingly, as shown in FIG. 2B, an opening edge 12d on the second groove path 12c side of the second ball circulating hole 13b is in the state in which the groove bottom is raised by an amount equal to the thickness of the polish margin 7c and there is a step 14 when seen from the intermediate groove path 12a side. Thus, by raising the groove bottom of the second groove path 12c compared to that of the intermediate groove path 12a, it is possible to prevent an overflow of the balls 20 from the intermediate groove path 12a to the second groove path 12c. Note that although the above explanation is about the groove shape around the second ball circulating hole 13b shown in FIG. 2B, the groove shape around the first ball circulating hole 13b is formed similarly, and therefore an outflow of the balls 20 from the intermediate groove path 12a to the first groove path 12b is prevented in the same manner as above.

By processing the intermediate groove path 12a and first groove path 12b (and similarly the second grove path 12c) so that their groove depths differ from each other as described above, it is possible to prevent an outflow of the balls 20 filled in the screw groove 12 to the first groove path 12b and second groove path 12c which are portions other than the ball screw track L1 in assembling a ball screw mechanism, and the balls 20 can smoothly circulate through the intermediate groove path 12a and circulator 11 in the assembled ball screw mechanism.

Note that in Embodiment 1 described above, although the groove depth of the intermediate groove path 12a is made deeper and thus made different from other portions by polishing process, it is also possible to obtain similar results by other processing methods such as precision cutting, rolling or the like, instead of polishing process. Besides, it is not necessary to make the whole range of the first groove path 12b and the second groove path 12c, which are portions other than the ball screw track L1, shallower compared to the groove depth of the intermediate groove path 12a. More specifically, from the point of view of preventing an outflow of balls from the ball screw track L1, it is important to make at least the groove depth of the opening edge 12d on the second groove path 12c side of the second ball circulating hole 13b (and an opening edge on the first groove path 12b side of the first ball circulating hole 13a) shallower compared to an opening edge 12e of the same on the intermediate groove path 12a side.

Further, in some configuration of the ball nut 7, the balls 20 flowed out of the ball screw track L1 can be discharged from an end portion of the ball nut 7. In such a case, the first groove path 12b or the second groove path 12c on the side capable of discharging the balls 20 can be processed in the same manner as the intermediate groove path 12a so as not to make a difference in the groove depth. In this case, the load of specifying the processing range in the finishing process (polishing process) of the screw groove 12 is reduced.

Figure 3:
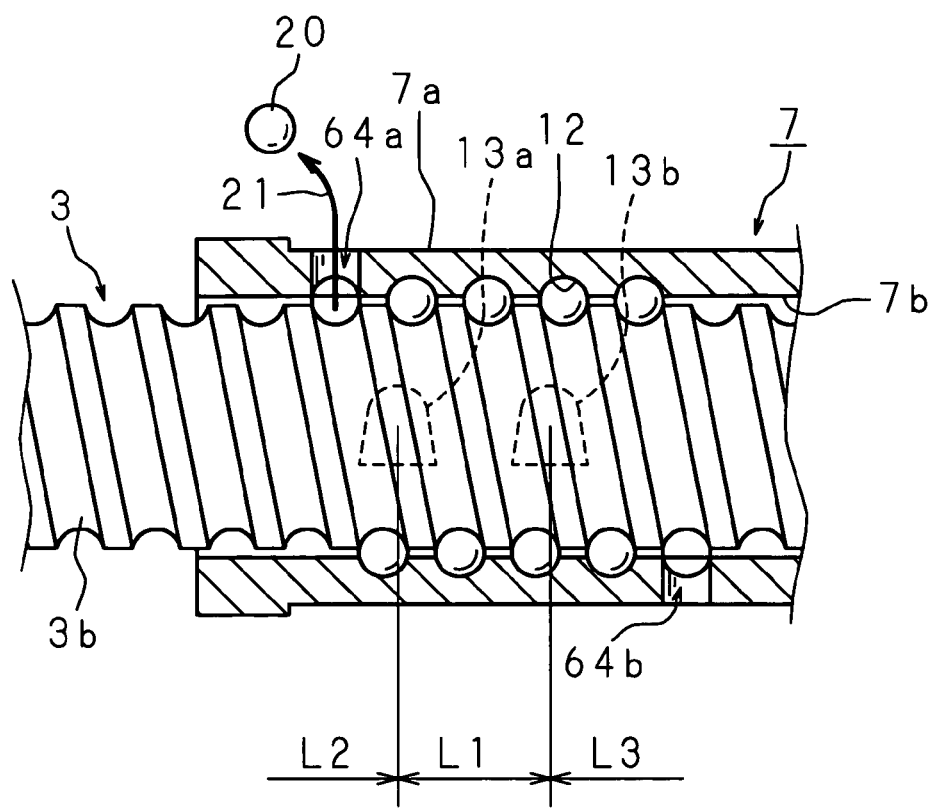
FIG. 3 is a cross sectional view of essential portion of a ball screw mechanism for electric power steering apparatus according to Embodiment 2 of the present invention.

FIG. 3 is a cross sectional view of essential portion of a ball screw mechanism for electric power steering apparatus according to Embodiment 2 of the present invention, and shows the ball screw portion 3b formed on the rack shaft 3 and the ball nut 7 configuring the ball screw mechanism. The basic configuration of an electric power steering apparatus incorporating the ball screw mechanism of Embodiment 2 is the same as that of Embodiment 1 shown in FIG. 1. The configuration of Embodiment 2 differs from Embodiment 1 in that the screw groove 12 formed on the inner circumference of the ball nut 7 is uniformly polished over the entire range, and that ball discharge holes 64a and 64b having a larger hole diameter than the outside diameter of the ball 20 are bored through the ball nut 7 at the groove path of the first outer track L2 and the groove path of the second outer track L3, respectively, which are ranges outside the ball screw track L1.

Unlike Embodiment 1, by polishing the screw groove 12 of Embodiment 2 so that it is entirely uniform without dividing the range, control for specifying the polishing range becomes easier. Note that by performing polishing process in such a manner, the groove depth of the screw groove 12 becomes uniform entirely, and consequently the balls 20 easily flow out to the first outer track L2 and second outer track L3 from the ball screw track L1 which is the groove path between the first ball circulating hole 13a and second ball circulating hole 13b. However, the balls 20 flowed out in such a manner are easily discharged from the ball discharge holes 64a and 64b as shown by an arrow 21.

Specifically, in the groove path corresponding to the first outer track L2 located further outside than the first ball circulating hole 13a with respect to the ball screw track L1, the ball discharge hole 64a having a larger hole diameter than the outside diameter of the ball 20 is bored so that it penetrates to the outer circumference 7a of the ball nut 7. Similarly, in the groove path corresponding to the second outer track L3 located further outside than the second ball circulating hole 13b with respect to the ball screw track L1, the ball discharge hole 64b having a larger hole diameter than the outside diameter of the ball 20 is bored so that it penetrates to the outer circumference 7a of the ball nut 7.

Accordingly, during assembling of the ball screw mechanism, the balls 20 flowed to the first outer track L1 are discharged outside through the ball discharge hole 64a, while the balls 20 flowed to the second outer track L2 are discharged outside through the ball discharge hole 64b. In particular, when the ball nut 7 is rotating, since a centrifugal force acts to push the balls 20 against the inner circumference 7a of the ball nut 7, the balls 20 are very easily discharged from the ball discharge holes 64a and 64b by the centrifugal force.

Besides, the closer the boring position of the ball discharge holes 64a and 64b to the ball screw track L1, in other words, to the first ball circulating hole 13a and second ball circulating hole 13b, the more quickly the balls 20 flowed to the outer track L2 or L3 are discharged.

Moreover, in some configuration of the ball nut 7, the balls 20 flowed out of the ball screw track L1 can be discharged from an end portion of the ball nut 7. In such a case, the ball discharge hole 64a or 64b may be bored only at the groove path of the first outer track L2 or second outer track L3 on the side from which the balls 20 cannot be discharged.

Figure 4:
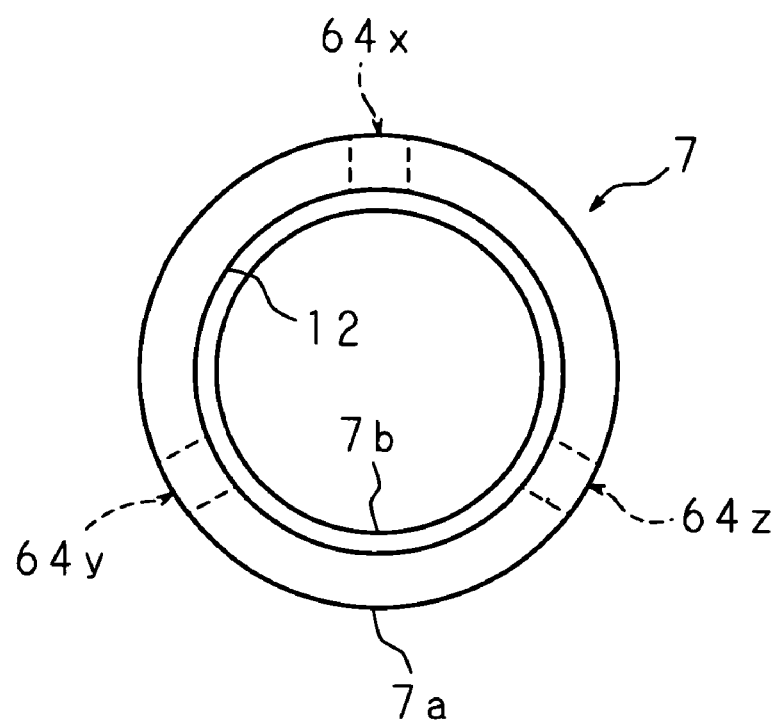
FIG. 4 is a side view of a ball nut according to a modified example of Embodiment 2.

It may also be possible to bore a plurality of ball discharge holes 64a, 64b at each of the outer tracks L2 and L3. In such a case, from the point of view of efficient discharge of balls, as shown by a modified example in FIG. 4, it is preferable to bore a first ball discharge hole 64x, a second ball discharge hole 64y and a third ball discharge hole 64z penetrating between the outer circumference 7a of the ball nut 7 and the inner circumference 7b where the screw groove 12 is formed, at appropriate intervals, for example, equal angle intervals, in the circumferential direction.

Furthermore, it may be possible to bore the ball discharge hole 64a at the groove path of the first outer track L2, and form the groove path on the second outer track L3 side so that the groove depth thereof is shallower than the groove depth of the intermediate groove path corresponding to the ball screw track L1 in the same manner as in Embodiment 1. By adopting such a configuration, the balls 20 flowed to the first outer track L2 can be discharged from the ball discharge hole 64a, and it is possible to prevent an outflow of the balls 20 to the second outer track L3 side and ensure smooth circulation of the ball nut 7. Note that it may, of course, be possible to reverse the above-described configuration in which the ball discharge hole 64a is bored at the first outer track L2 and the groove depth of the groove path of the second outer track L3 is made shallower.

As described in detail above, according to the present invention, since it is possible to prevent an outflow of balls from a ball screw track in which the balls are intended to be circulated, it is possible to eliminate the fear of an outflow of balls to a groove path outside the range of the ball screw track in assembling a ball screw mechanism, and ensure smooth rotation of the ball nut even after assembling.

Moreover, according to the present invention, since the balls flowed out of the ball screw track are naturally discharged outside the ball nut through the ball discharge hole, it is possible to prevent the situation where an end portion of the circulator is pushed and eliminate the necessity of increasing the size of the ball nut, and therefore an electric power steering apparatus incorporating such a ball nut ensures good steering feeling.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A ball screw mechanism for an electric power steering apparatus, comprising:
   a ball nut having an outer circumference and an inner circumference, wherein the ball nut is fitted around a ball screw portion of a steering shaft;
   the ball nut further including a screw groove formed on the inner circumference, a first circulating hole forming a passageway between the outer circumference and the inner circumference of the ball nut, and a second circulating hole forming another passageway between the outer circumference and the inner circumference of the ball nut;
   a ball screw track in communication with the ball nut inner circumference, having respective opposing ends at the first circulating hole and the second circulating hole, being formed by the engagement of the screw groove and the ball screw portion of the steering shaft, wherein balls travel in the ball screw track;
   a circulator having a first opening and a second opening, the first opening of the circulator attached to the outer circumference of the ball nut approximating the first circulating hole, and the second opening of the circulator attached to the outer circumference of the ball nut approximating the second circulating hole, wherein the circulator guides the balls from the first circulating hole to the second circulating hole; and
   a step in the screw groove adjacent to at least one of the first circulating hole and the second circulating hole, wherein the step is a change in depth of the screw groove at least one of the respective opposing ends of the ball screw track.

2. The ball screw mechanism of claim 1, wherein the step is formed by making the depth of the screw groove within the ball screw track deeper than the depth of the screw groove outside the ball screw track.

3. The ball screw mechanism of claim 1, the circulating holes further comprising an opening edge within the ball screw track, wherein the step adjacent to at least one of the circulating holes is formed by a deeper screw groove at the opening edge of the circulating hole compared to the edge of the circulating hole not within the opening edge.

4. A ball screw mechanism for an electric power steering apparatus, comprising:
   a ball nut having an outer circumference and an inner circumference, wherein the ball nut is fitted around a ball screw portion of a steering shaft;

the ball nut further including a screw groove formed on the inner circumference, a first circulating hole forming a passageway between the outer circumference and the inner circumference of the ball nut, and a second circulating hole forming another passageway between the outer circumference and the inner circumference of the ball nut;

a ball screw track in communication with the ball nut inner circumference, having respective opposing ends at the first circulating hole and the second circulating hole, being formed by the engagement of the screw groove and the ball screw portion of the steering shaft, wherein balls travel in the ball screw track;

a circulator having a first opening and a second opening, the first opening of the circulator attached to the outer circumference of the ball nut approximating the first circulating hole, and the second opening of the circulator attached to the outer circumference of the ball nut approximating the second circulating hole, wherein the circulator guides the balls from the first circulating hole to the second circulating hole; and the screw groove having a third circulating hole, forming a passageway between the outer circumference and the inner circumference of the ball nut, wherein the third circulating hole is outside the ball screw track.

* * * * *